US008210206B2

(12) United States Patent
Coakley

(10) Patent No.: US 8,210,206 B2
(45) Date of Patent: Jul. 3, 2012

(54) DUAL REDUNDANT SERVOVALVE

(75) Inventor: Kim Lige Coakley, Frazier Park, CA (US)

(73) Assignee: Woodward HRT, Inc., Santa Clara, CA (US)

( * ) Notice: Subject to any disclaimer, the term of this patent is extended or adjusted under 35 U.S.C. 154(b) by 1219 days.

(21) Appl. No.: 11/945,668

(22) Filed: Nov. 27, 2007

(65) Prior Publication Data

US 2009/0133767 A1 May 28, 2009

(51) Int. Cl.
*F16K 31/04* (2006.01)
*F16K 11/065* (2006.01)
*F16K 37/00* (2006.01)

(52) U.S. Cl. ......... 137/625.65; 137/625.68; 137/625.69; 137/554; 251/129.04; 251/129.11

(58) Field of Classification Search ............. 137/596.17, 137/625.65, 625.68, 625.69, 625.64, 596.16; 251/129.04, 129.11
See application file for complete search history.

(56) References Cited

U.S. PATENT DOCUMENTS

| | | | | |
|---|---|---|---|---|
| 2,826,896 | A | 3/1958 | Glaze et al. | |
| 3,338,138 | A | 8/1967 | Wood | |
| 4,129,145 | A * | 12/1978 | Wynn | 137/541 |
| 4,216,795 | A * | 8/1980 | Cobb et al. | 137/554 |
| 4,338,965 | A * | 7/1982 | Garnjost et al. | 137/554 |
| 4,596,177 | A | 6/1986 | Biafore | |
| 4,793,377 | A | 12/1988 | Haynes et al. | |
| 4,987,927 | A * | 1/1991 | Kluczynski | 137/625.65 |
| 5,063,966 | A | 11/1991 | Amico et al. | |
| 5,094,260 | A * | 3/1992 | Stuart et al. | 137/102 |
| 5,325,669 | A | 7/1994 | Barker et al. | |
| 5,560,387 | A * | 10/1996 | Devier et al. | 137/1 |
| 6,076,767 | A | 6/2000 | Farley et al. | |
| 6,439,512 | B1 | 8/2002 | Hart | |
| 2005/0000580 | A1* | 1/2005 | Tranovich et al. | 137/625.65 |

FOREIGN PATENT DOCUMENTS

WO WO 2006/006950 1/2006

OTHER PUBLICATIONS

International Search Report and Written Opinion from PCT/US2008/074759, mailed on Dec. 9, 2008.

* cited by examiner

*Primary Examiner* — Stephen M Hepperle
*Assistant Examiner* — Jonathan Waddy
(74) *Attorney, Agent, or Firm* — BainwoodHuang

(57) ABSTRACT

A servovalve includes a single motor which actuates separate valve members of separate servovalve assemblies. Each of the valve members controls the flow of hydraulic fluid from separate hydraulic fluid sources. In order to provide each valve member with the ability to operate in the event that the other valve member becomes inoperable, such as caused by jamming of the valve member, each servovalve assembly includes a compression assembly that provides each servovalve assembly with a jam-override capability.

20 Claims, 3 Drawing Sheets

DUAL REDUNDANT SERVOVALVE

BACKGROUND

Conventional servovalves convert relatively low power electrical control input signals into a relatively large mechanical power output. For example, during operation pressurized fluid enters the direct drive servovalve and, based upon the control input signals, drives a fluid actuator to operate variable-geometry elements such as associated with an aircraft.

A typical direct drive servovalve includes a housing, a valve member such as a spool, a motor, and a sensor. The housing defines a fluid pathway with the valve member being disposed within the fluid pathway. The motor is configured to move the valve member within the fluid pathway between an open and closed position in order to control an amount of fluid flow within the pathway. The sensor is configured to sense a position of the valve member within the fluid pathway and a rotational orientation of the motor's rotor assembly.

During operation, an electronic controller receives a command signal from a user input device which directs the controller to operate the servovalve in a particular manner (e.g., increase flow, decrease flow, terminate flow, etc.). The controller also receives a position signal from the sensor thus enabling the controller to determine the present position of the valve member within the fluid pathway. The controller then sends a control signal to the motor based on both the command signal and the position signal to control the rotational orientation of the rotor assembly. As a result, the rotor assembly moves the valve member to a desired position within the fluid pathway thus controlling amount of fluid flow relative to the fluid actuator.

SUMMARY

Embodiments of the present invention relate to a servovalve that includes a single motor which actuates separate valve members of separate or redundant servovalve assemblies. Each of the valve members controls the flow of hydraulic fluid from separate hydraulic fluid sources to provide redundant control of a fluid actuator. In order to provide each valve member with the ability to operate in the event that the other valve member becomes inoperable, such as caused by jamming of the valve member by debris carried in the hydraulic fluid, each servovalve assembly includes a compression assembly that provides each servovalve assembly with a jam-override capability.

In one arrangement, the compression assembly is configured as a pair of pistons disposed within a channel defined by the valve member and each piston being preloaded by supply pressure against a corresponding stop in the valve member channel. In the case where both valve members are able to translate within their respective fluid pathways, a force generated by the valve member drive portion on the pistons is less than the preload forces exerted by the pistons on the stops. Accordingly, rotation of the rotor assembly causes each valve member to translate within its respective fluid pathway. In the case where one valve member cannot translate within a fluid pathway of the servovalve assembly (i.e., becomes jammed), a force generated by the valve member drive portion on one of the pistons of the jammed valve member is greater than the forces exerted by the piston on the corresponding stop. Accordingly, rotation of the rotor assembly causes the non-jammed valve member to translate within its respective fluid pathway and causes the valve member drive portion to displace one of the preloaded pistons relative to the stop. As such, the compression assembly allows continuous operation of one of the servovalve assemblies of the servovalve in the event of a valve member of a second servovalve assembly of the servovalve becomes jammed.

In one arrangement, a servovalve includes a motor having a rotor shaft defining a first end and a second end, the second end opposing the first end. The servovalve includes a first servovalve assembly having a first housing defining a first fluid pathway and a first valve member disposed within the first fluid pathway, the first valve member having a first compression assembly configured to apply a first preload to a first stop. The servovalve includes a second servovalve assembly having a second housing defining a second fluid pathway and a second valve member disposed within the second fluid pathway, the second valve member having a second compression assembly configured to apply a second preload to a second stop. The motor is configured to cause the rotor shaft to apply a first force to the first compression assembly and to the second compression assembly when the first valve member is translatable within the first fluid pathway and the second valve member is translatable within the second fluid pathway the first force being less than or equal to the first preload applied by the first compression assembly and the second preload applied by the second compression assembly. The motor is also configured to cause the rotor shaft to apply an increased force to one of the first compression assembly and the second compression assembly when one of the first valve member and the second valve member is not translatable within the respective one of the first fluid pathway and the second fluid pathway, the increased force being greater than one of the first preload applied by the first compression assembly and the second preload applied by the second compression assembly.

In one arrangement a servovalve includes a motor having a rotor shaft defining a first end and a second end, the second end opposing the first end. The servovalve includes a first servovalve assembly having a first housing defining a first fluid pathway and a first valve member disposed within the first fluid pathway, the first valve member having a first compression assembly configured to apply a first preload to a first stop. The servovalve includes a second servovalve assembly having a second housing defining a second fluid pathway and a second valve member disposed within the second fluid pathway, the second valve member having a second compression assembly configured to apply a second preload to a second stop. The servovalve includes a first displacement sensor carried by the first valve assembly, the first displacement sensor being configured to generate a position signal indicating a relative position of the first valve member within the first fluid pathway. The servovalve includes a second displacement sensor carried by the second valve assembly, the second displacement sensor being configured to generate a position signal indicating a relative position of the second valve member within the second fluid pathway. The servovalve includes a controller in electrical communication with the first displacement sensor. The controller is configured to receive a command signal from a user input device, receive a first position signal from the first displacement sensor, and receive a second position signal from the second displacement sensor and compare the command signal with the first position signal and the second position signal. In response to detecting a difference between the command signal and the first position signal and a difference between the command signal and the second position signal, the controller is configured to transmit a control signal to the motor to position the first valve member and the second valve member to a commanded position.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a servovalve that includes a single motor which actuates separate valve members of separate servovalve assemblies. Each of the valve members controls the flow of hydraulic fluid from separate hydraulic fluid sources. In order to provide each valve member with the ability to operate in the event that the other valve member becomes inoperable, such as caused by jamming of the valve member by debris carried in the hydraulic fluid, each servovalve assembly includes a compression assembly that provides each servovalve assembly with a jam-override capability.

In one arrangement, the compression assembly is configured as a pair of pistons disposed within a channel defined by the valve member and preloaded by supply pressure against a stop in the valve member. In the case where both valve members are able to translate within their respective fluid pathways, a force generated by the valve member drive portion on the pistons is less than the preload forces exerted by the pistons on the stop in the valve member. Accordingly, rotation of the rotor assembly causes each valve member to translate within its respective fluid pathway. In the case where one valve member cannot translate within a fluid pathway of the servovalve assembly (i.e., a valve member becomes jammed), a force generated by the valve member drive portion on the pistons of the jammed valve member is greater than the forces exerted by the pistons on the stop in the valve member. Accordingly, rotation of the rotor assembly causes the non-jammed valve member to translate within its respective fluid pathway and causes the valve member drive portion to compress one of the preloaded pistons relative to the jammed valve member. Accordingly, the compression assembly allows continuous operation of one of the servovalve assemblies of the servovalve in the event of a valve member of a second servovalve assembly of the servovalve becomes jammed.

Figure 1:
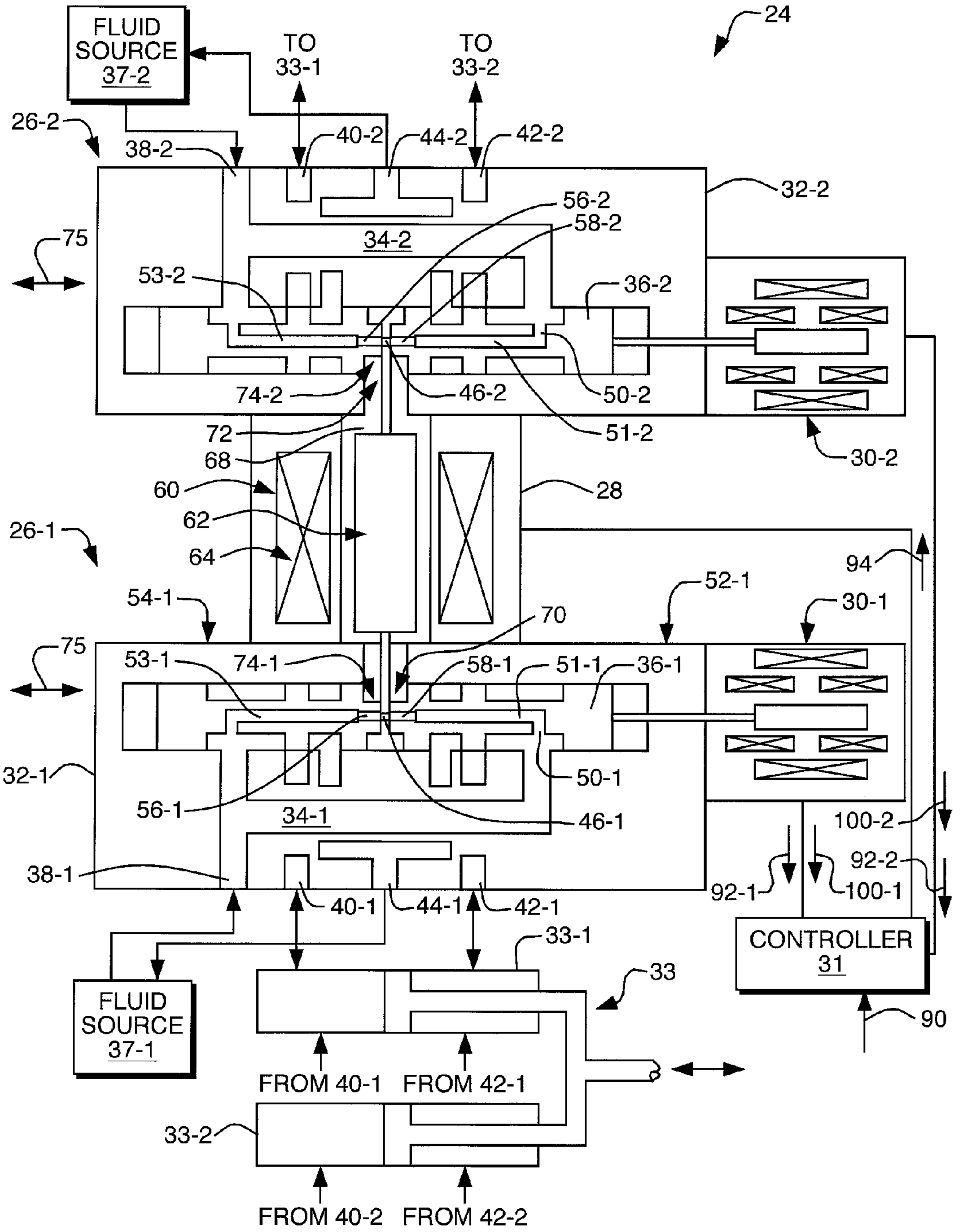
FIG. 1 illustrates a schematic representation of a servovalve, according to one embodiment of the invention.

FIG. 1 shows an arrangement of a servovalve 24. The servovalve 24 includes two servovalve assemblies 26-1, 26-2, a motor such as a direct drive servovalve motor 28, two displacement sensors 30-1, 30-2, such as linear variable displacement transducers (LVDTs), and a controller 31, such as a processor and memory. The controller 31 is configured to operate the direct drive servovalve motor 28 in order to control operation of the two servovalve assemblies 26-1, 26-2.

Figure 2:
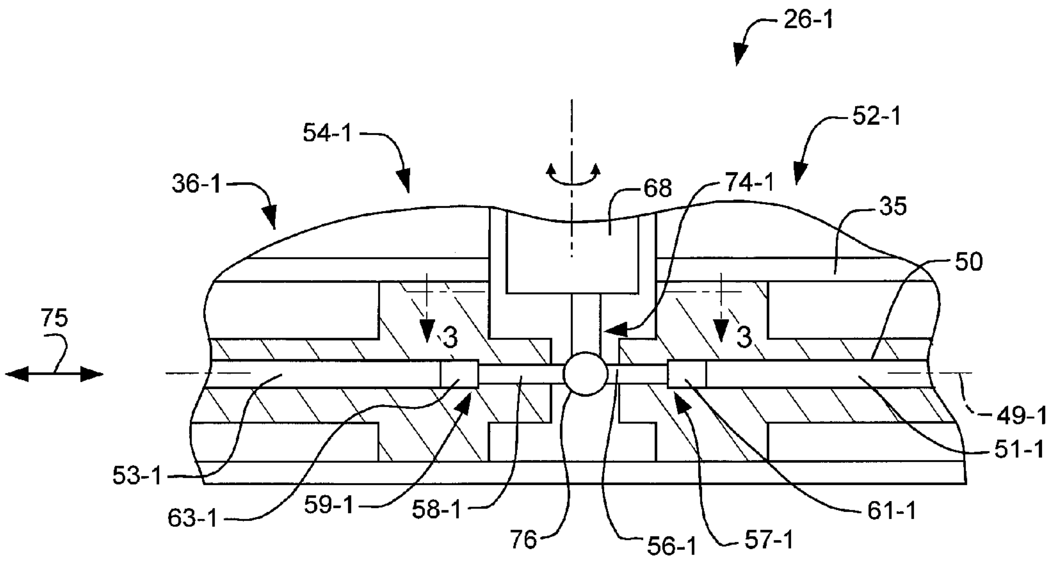
FIG. 2 illustrates a schematic representation of a rotor assembly, valve member and compression assembly of FIG. 1.

Each servovalve assembly 26-1, 26-2 includes a housing 32-1, 32-2 defining a fluid pathway 34-1, 34-2. Each housing 32-1, 32-2 includes a sleeve 35, as shown in FIG. 2, and a valve member 36-1, 36-2, such as a spool, disposed within the corresponding fluid pathway 34-1, 34-2. Each valve member 36-1, 36-2 is configured to meter an amount of fluid flowing from a corresponding pressurized fluid source 37-1, 37-2, through the corresponding fluid pathway 34-1, 34-2, and to a hydraulic or fluid actuator 33. Accordingly, each servovalve assembly 26-1, 26-2 provides redundant control of the fluid actuator 33 where the first servovalve assembly 26-1 controls a first portion 33-1 of the fluid actuator 33 and the second servovalve assembly 26-2 controls a second portion 33-2 of the fluid actuator 33.

Each housing 32-1, 32-2 includes valve control ports used to control the positioning of the valve members 36-1, 36-2 within its respective fluid pathway 34-1, 34-2. For example, with reference to the first housing 32-1, the housing 32-1 includes a supply input 38-1 to the fluid pathway 34-1 through which the fluid source 37-1 directs a pressurized hydraulic fluid. The housing 32-1 also includes first and second control outputs 40-1, 42-1 which direct the pressurized fluid from the fluid pathway 34-1 to the fluid actuator 33 as well as a return output 44-1 that directs the pressurized fluid to the reservoir of the fluid source 37-1.

As shown in FIG. 1, the direct drive servovalve motor 28 includes a stator 60 and a rotor assembly 62. The stator 60 is in a fixed position relative to the first and second valve assembly housings 32-1, 32-2, and the rotor assembly 62 is configured to rotate to particular angular positions relative to the stator 60 in response to particular currents passing through coils 64 of the stator 60. For example, the rotor assembly 62 is configured to rotate within a limit arc range (e.g., +/−20 degrees) in order to drive the valve members 36-1, 36-2 between a fully closed position and a fully open position within the respective fluid pathways 34-1, 34-2.

Figure 3:
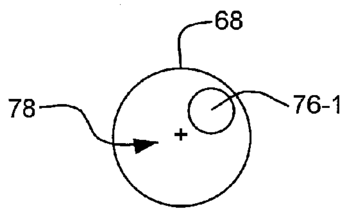
FIG. 3 illustrates a sectional view of the rotor assembly taken along line 3-3 in FIG. 2.

The rotor assembly 62 includes a rotor shaft 68 having a first end 70 carried by the first valve member 36-1 and an opposing second end 72 carried by the second valve member 36-2. Each end 70, 72 includes a valve member drive portion 74-1 and 74-2 respectively configured to apply the rotary motion of the rotor shaft 68 to each respective valve member 36-1, 36-2 and cause each valve member 36-1, 36-2 to longitudinally translate 75 within each respective fluid pathway 34-1, 34-2, thereby modulating fluid flow through the valve control ports. For example, the rotor shaft 62 includes valve member drive portions 74-1, 74-2 disposed at either end of the rotor shaft and carried by the valve members 36-1, 36-2. In one arrangement, as illustrated in FIG. 3 and with reference to the first servovalve assembly 26-1, the valve member drive portion 74-1 includes an eccentric drive element 76-1, such as a ball formed from a tungsten carbide material, coupled to the rotor shaft 68 at a location off-axis to an axis of rotation 78 of the rotor shaft 68. In use, the direct drive servovalve motor 28 is configured to provide a force of about 100 pounds to each valve member 36-1, 36-2 via the respective valve member drive portions 74-1, 74-2.

Returning to FIGS. 1 and 2, each servovalve assembly 26-1, 26-2 includes a compression assembly 46-1, 46-2 that provides each servovalve assembly 26-1, 26-2 with a jam-override capability, as will be described in detail below. As illustrated in FIG. 2 and with reference to the first servovalve assembly 26-1 for convenience, the valve member 36-1 defines a channel 50 extending along a longitudinal axis 49-1 of the valve member 36-1. The channel 50 is disposed in fluid communication with the pressurized fluid source 37-1. For example, as illustrated in FIG. 1, the fluid source 37-1 is coupled to the supply input 38-1 of the housing 32-1 and provides pressurized fluid to a first channel portion 51-1 defined within a first valve member 36-1 and to a second channel portion 53-1 defined within the first valve member 36-1. Each channel portion 51-1, 53-1 defines a corresponding stop 57-1, 59-1. In one arrangement, each stop 57-1, 59-1 corresponds to a reduction in diameter of each corresponding channel portion 51-1, 53-1. With reference to the first servovalve assembly 26-1 in FIGS. 1 and 2 for convenience, the compression assembly 46-1 includes a first piston 56-1 disposed within the first channel portion 51-1 and a second piston 58-1 disposed within the second channel portion 53-1. The pressurized fluid contained within the first and second channel portions 51-1, 53-1 generates a load on a head portion 61-1, 63-1 of each of the pistons 56-1, 58-1 and causes the pistons to be preloaded against the respective stops 57-1, 59-1 in the valve member 36-1. In one arrangement, each piston 56-1, 58-1 generates a preload of approximately 50 pounds force on each respective stop 57-1, 59-1.

In one arrangement, the compression assemblies 46-1, 46-2 are configured to provide a transfer of load between valve member drive portions 74-1, 74-2 and the respective valve members 36-1, 36-2 in the case where each of valve members 36-1, 36-2 is translatable within its respective fluid pathway 34-1, 34-2. For example, during operation, the controller 31 receives a command signal 90 from a user input device which directs the controller 31 to operate the servovalve assemblies 26-1, 26-2 in a particular manner (e.g., increase flow, decrease flow, terminate flow, etc.). The controller 31 also receives position signals 92-1, 92-2 from each of the displacement sensors 30-1, 30-2 thus enabling the controller 31 to determine the present position of each valve member 36-1, 36-2 within its respective fluid pathway 34-1, 34-2. This controller 31 compares the command signal 90 with the position signals 92-1, 92-2 and, when the controller detects a difference between the command signal 90 and the position signals 92-1, 92-2, the controller 31 transmits a control signal 94 to the motor 28.

In response to the control signal 94 received from the controller 31 by the stator 60, the rotor assembly 62 rotates relative to the stator 60. Rotation of the rotor assembly 62 causes each of the valve member drive portions 74-1, 74-2 to rotate within the respective valve members 36-1, 36-2 and generate a load on either the first pistons 56-1, 56-2 associated with the valve members 36-1, 36-2 or on the second pistons 58-1, 58-2 associated with the valve members 36-1, 36-2, depending upon the direction of rotation of the rotor assembly 62. In the case where each of valve members 36-1, 36-2 is translatable within its respective fluid pathway 34-1, 34-2, the force generated by the valve member drive portions 74-1, 74-2 on either the first pistons 56-1, 56-2 associated with the valve members 36-1, 36-2 or on the second pistons 58-1, 58-2 associated with the valve members 36-1, 36-2 is less than or substantially equal to the force generated by the respective piston 56-1, 56-2, 58-1, 58-2 on the valve member drive portions 74-1, 74-2. Accordingly, as the valve member drive portions 74-1, 74-2 rotate within the respective valve members 36-1, 36-2, such rotation causes the valve members 36-1, 36-2 to laterally translate 75 within their associated fluid pathways 34-1, 34-2. Such lateral translation modulates the flow of fluid from the pressurized fluid sources 37-1, 37-2 to the respective fluid actuators 33-1, 33-2.

In one arrangement, the compression assemblies 46-1, 46-2 are configured to provide each servovalve assembly 26-1, 26-2 with a jam-override capability and allow rotation of the valve member drive portions 74-1, 74-2 within one of the valve members 36-1, 36-2 when that valve member loses the ability to translate within its respective fluid pathway 34-1, 34-2. For example, assume that the fluid pathway 34-1 includes relatively large debris particles lodged between the valve member 36-1 and its corresponding sleeve 35 such that the valve member 36-1 cannot translate longitudinally along the fluid pathway 34-1 and is effectively jammed within the sleeve 35.

In response to the control signal 94 received from the controller 31 by the stator 60, the rotor assembly 62 rotates relative to the stator 60. Rotation of the rotor assembly 62 causes each of the valve member drive portions 74-1, 74-2 to rotate within the respective valve members 36-1, 36-2 and generate a load on either the first pistons 56-1, 56-2 associated with the valve members 36-1, 36-2 or on the second pistons 58-1, 58-2 associated with the valve members 36-1, 36-2, depending upon the direction of rotation of the rotor assembly 62. In the case where the second valve member 36-2 is translatable within its fluid pathway 34-2, the force generated by the valve member drive portion 74-2 on either the first piston 56-2 or on the second piston, 58-2 associated with the valve members 36-1, 36-2 is less than or substantially equal to the force generated by the pistons 56-2, 58-2 on the corresponding stops 57-2, 59-2. However, because the first valve member 36-1 cannot be translated within the fluid pathway 34-1, as the valve member drive portion 74-1 rotates within the valve member 36-1, the valve member drive portion 74-1 generates a load on either the first piston 56-1 or on the second piston 58-1 that exceeds the preload exerted by either the first piston 56-1 or the second piston 58-1 on the corresponding stop 57-1, 59-1. Accordingly, the valve member drive portion 74-1 displaces either the first or second piston 56-1, 58-1 and allows continued rotation of the rotor 62, thereby allowing the rotor 62 to control the position of the second valve member 36-2 of the second servovalve assembly 32-2. As such, in this example, the compression assembly 46-1 allows continuous operation of the second servovalve assembly to control the fluid actuator 33 when the first valve member 36-1 becomes inoperative.

In one arrangement, the displacement sensors 30-1, 30-2 also provide the controller 31 with the ability to detect failure or jamming of a particular valve member 36-1, 36-2. For example, during operation, as the controller 31 transmits the control signal 94 to the motor 28, the controller 31 receives position signals 100-1, 100-2 from the respective displacement sensors 30-1, 30-2. The controller 31 then compares the position signals 100-1, 100-2 to an analytical model of a valve member response to detect either translation or non-translation of a particular valve member 36-1, 36-2. While the analytical model of the valve member response can be configured in a variety of ways, in one arrangement, the analytical model relates to a decrease in error between a command signal 90 and the position signals 100-1, 100-2 over time. Taking the first servovalve assembly 26-1 as an example, in the case where the controller 31 compares the position signals 100-1 to the analytical model assume that the controller 31 detects that there is a decrease in the error between the command signal 90 and the position signal 100-1 over time (i.e., the error between the command signal 90 and the position signal 100-1 goes to zero over a 50 millisecond to 100 millisecond time range). Accordingly, the controller 31 detects translation of the first valve member 36-1 within the first fluid pathway 34-1. However, in the case where the controller 31 compares the position signals 100-1 to the analytical model, assume that the controller 31 detects a substantially constant or non-decreasing error between the command signal 90 and the position signal 100-1. Such a non-decreasing error indicates that the actual position of the valve member 36-1 within the servovalve assembly 26-1 does not correspond to the commanded position of the valve member 36-1, as provided from the user input device. In this case, because of the relatively constant error, the controller 31 detects non-translation of the first valve member 36-1 within the first fluid pathway 34-1.

In one arrangement, the controller 31 is configured to adjust the pressure within the inoperative servovalve assembly to allow the pistons 56, 58 of the compression assembly 46 to move freely within the channel 50 and to minimize or eliminate the requirement that the motor 20 and the valve member drive portions 74-1, 74-2 generate enough load to overcome the preload of the compression assembly 46. Continuing with the example from above, in the case where the controller 31 detects non-translation of the first valve member 36-1, to remove the first preload generated by the compression assembly 46-1, the controller 31 actuates a valve in the supply line from fluid source 37-1 to the first servovalve assembly 26-1 to block supply pressure and vent the hydraulic fluid from the supply input 38-1 to the return output 44-1, thus removing the hydraulic fluid pressure from the channel 50 and removing the pressure on the pistons 56-1, 58-1 of the jammed first valve member 46-1.

While various embodiments of the invention have been particularly shown and described, it will be understood by those skilled in the art that various changes in form and details may be made therein without departing from the spirit and scope of the invention as defined by the appended claims.

For example, as indicated above, the pressurized fluid contained within the first and second channel portions 51, 53 generates a load on each of the pistons 56, 58 and causes the pistons 56, 58 to generate a preload on the corresponding stops 57, 59 within valve member 36. Such description is by way of example only. In one arrangement, springs members disposed within the channel 50 of the valve member 36 cause the pistons 56, 58 to generate a preload on the stops 57, 59 within valve member 36.

As indicated above, the displacement sensors 30-1, 30-2 can be configured as an LVDT. In one arrangement, each displacement sensor 30-1, 30-2 is configured as a set of multiple LVDTs. For example, each displacement sensor 30-1, 30-2 includes three separate LVDTs to detect the positioning of the valve members 36-1, 36-2 within the servovalve assemblies 26-1, 26-2. The use of multiple LVDTs as a displacement sensor 30 provides a level of redundancy to the displacement measurements.

Figure 4:
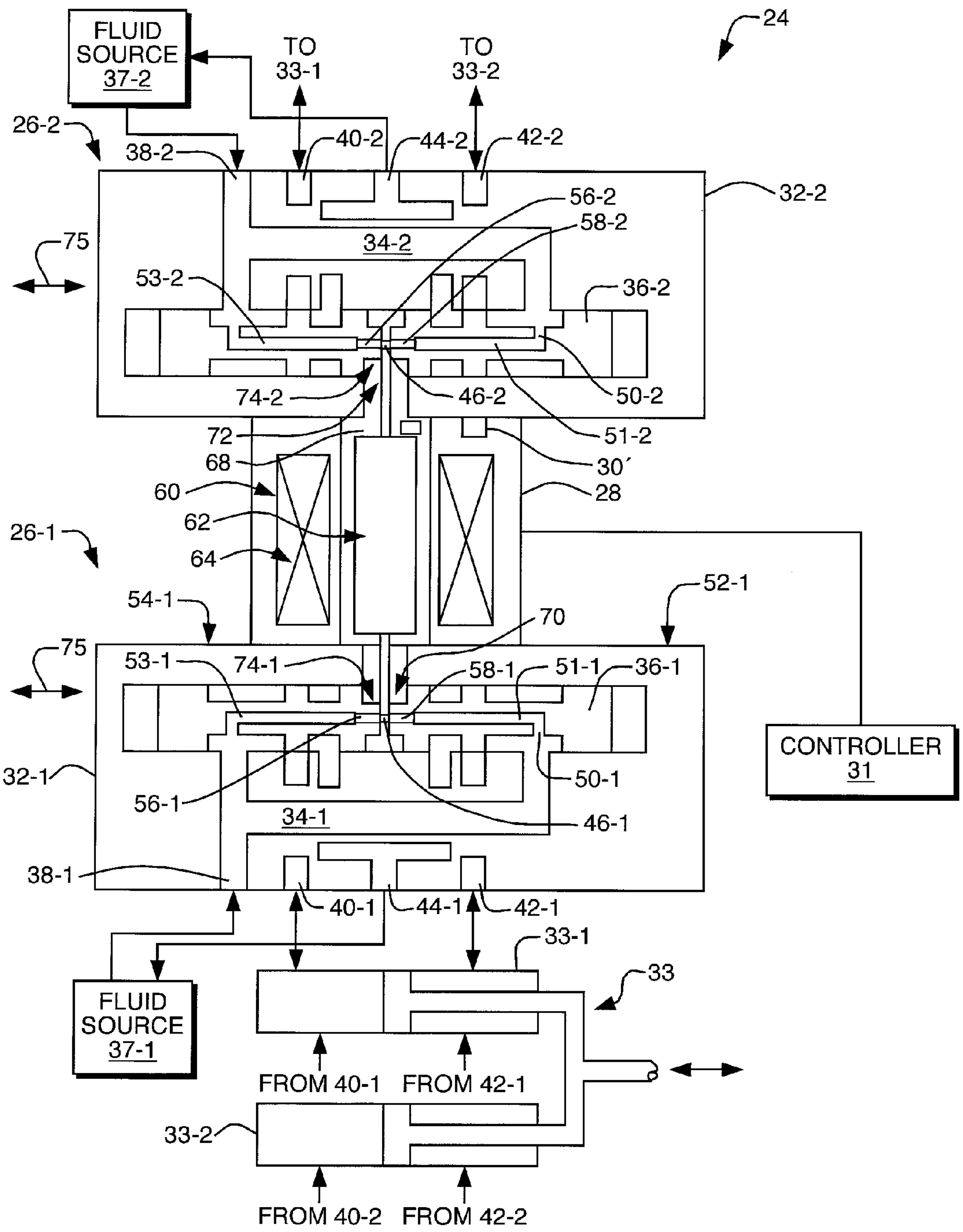
FIG. 4 illustrates a schematic representation of a servovalve, according to a second embodiment of the invention.

As indicated above, the displacement sensors 30-1, 30-2 are coupled to the valve members 36-1, 36-2 and are configured to detect the positioning of the valve members 36-1, 36-2 within the servovalve assemblies 26-1, 26-2. Such description is by way of example only. In one arrangement, as shown in FIG. 4, a rotary sensor 30' is disposed on the direct drive servovalve motor 28. For example, as illustrated in FIG. 4, the rotary sensor 30' such as a Hall effect sensor can have a first sensor component disposed on the stator 60 and second component disposed on the rotor assembly 62. Motion of the first component relative to the second component causes the rotary sensor 30' to generate a signal indicative of the position of the valve members 36-1, 36-2 within the servovalve assemblies 26-1, 26-2.

What is claimed is:

1. A servovalve, comprising:

a motor having a rotor shaft defining a first end and a second end, the second end opposing the first end;

a first servovalve assembly having:

a first housing defining a first fluid pathway, and a first valve member disposed within the first fluid pathway, the first valve member having a first compression assembly configured to apply a first preload to a first stop and a second stop defined within the first valve member; and a second servovalve assembly having:

a second housing defining a second fluid pathway, and a second valve member disposed within the second fluid pathway, the second valve member having a second compression assembly configured to apply a second preload to a first stop and a second stop defined within the second valve member;

the motor being configured to cause the rotor shaft to (i) apply a first force to the first compression assembly and to the second compression assembly when the first valve member is translatable within the first fluid pathway and the second valve member is translatable within the second fluid pathway, the first force being less than or equal to the first preload applied by the first compression assembly and the second preload applied by the second compression assembly and (ii) apply a second force to one of the first compression assembly and the second compression assembly when one of the first valve member and the second valve member is not translatable within the respective one of the first fluid pathway and the second fluid pathway, the second force being greater than one of the first preload applied by the first compression assembly and the second preload applied by the second compression assembly;

wherein the first valve member defines a first valve member channel extending along a longitudinal axis of the first valve member;

wherein the first end of the rotor shaft comprises a first valve member drive portion disposed within the first valve member channel of the first valve member;

wherein the first compression assembly comprises:

a first piston disposed within the first valve member channel of the first valve member and disposed in fluid communication with a first pressurized fluid source, the first piston configured to apply the first preload, generated by the first pressurized fluid source, to the first stop within the first valve member, and a second piston disposed within the first valve member channel of the first valve member and disposed in fluid communication with the first pressurized fluid source, the second piston configured to apply the first preload, generated by the first pressurized fluid source, to the second stop within the first valve member, the second piston of the first compression assembly opposing the first piston of the first compression assembly;

wherein the second valve member defines a second valve member channel extending along a longitudinal axis of the second valve member; and wherein the second compression assembly comprises:

a first piston disposed within the second valve member channel of the second valve member and disposed in fluid communication with a second pressurized fluid source, the first piston configured to apply the second preload, generated by the second pressurized fluid source, to the first stop within the second valve member, and a second piston disposed within the second valve member channel of the second valve member and disposed in fluid communication with the second pressurized fluid source, the second piston configured to apply the second preload, generated by the second pressurized fluid source, to the second stop within the second valve member, the second piston of the second compression assembly opposing the first valve member drive portion.

2. The servovalve of claim 1, wherein:

the second end of the rotor shaft comprises a second valve member drive portion disposed within the second valve member channel of the second valve member.

3. The servovalve of claim 1, comprising:

a first displacement sensor carried by the first valve assembly, the first displacement sensor configured to generate a position signal indicating a relative position of the first valve member within the first fluid pathway; and a second displacement sensor carried by the second valve assembly, the second displacement sensor configured to generate another position signal indicating a relative position of the second valve member within the second fluid pathway.

4. The servovalve of claim 3, comprising a controller in electrical communication with the first displacement sensor, the second displacement sensor, and the motor, the controller configured to:

receive a command signal from a user input device;

receive, as the position signal, a first position signal from the first displacement sensor and receive, as the other position signal, a second position signal from the second displacement sensor;

compare the command signal with the first position signal and the second position signal;

in response to detecting a difference between the command signal and the first position signal and a difference between the command signal and the second position signal, transmit a control signal to the motor to position the first valve member and the second valve member to a commanded position.

5. The servovalve of claim 3, comprising a controller in electrical communication with the first displacement sensor, the second displacement sensor, and the motor, wherein the controller is configured to:

receive, as the position signal, a first position signal from the first displacement sensor;

compare the first position signal from the first displacement sensor to an analytical model of the first valve member response;

when the first position signal from the first displacement sensor corresponds to the analytical model of the first valve member response, detect translation of the first valve member disposed within the first fluid pathway; and when the first position signal from the first displacement sensor does not correspond to the analytical model of the first valve member response, detect non-translation of the first valve member disposed within the first fluid pathway.

6. The servovalve of claim 5, wherein in response to detecting non-translation of the first valve member disposed within the first fluid pathway, the controller is configured to cause the first compression assembly to remove the first preload from the first stop within the first valve member.

7. The servovalve of claim 3, comprising a controller in electrical communication with the first displacement sensor, the second displacement sensor, and the motor, wherein the controller is configured to:

receive, as the other position signal, a first position signal from the second displacement sensor;

compare the first position signal from the second displacement sensor to an analytical model of the second valve member response;

when the first position signal from the second displacement sensor corresponds to the analytical model of the second valve member response, detect translation of the second valve member disposed within the second fluid pathway; and when the first position signal from the second displacement sensor does not correspond to the analytical model of the second valve member response, detect non-translation of the second valve member disposed within the second fluid pathway.

8. The servovalve of claim 7, wherein in response to detecting non-translation of the second valve member disposed within the second fluid pathway, the controller is configured to cause the second compression assembly to remove the second preload from the second stop within the second valve member.

9. The servovalve of claim 3, wherein the first displacement sensor comprises at least two linear variable differential transformers.

10. The servovalve of claim 3, wherein the second displacement sensor comprises at least two linear variable differential transformers.

11. A servovalve, comprising:

a motor having a rotor shaft defining a first end and a second end, the second end opposing the first end;

a first servovalve assembly having:

a first housing defining a first fluid pathway, and a first valve member disposed within the first fluid pathway, the first valve member having a first compression assembly configured to apply a first preload to a first stop and a second stop within the first valve member;

a second servovalve assembly having:

a second housing defining a second fluid pathway, and a second valve member disposed within the second fluid pathway, the second valve member having a second compression assembly configured to apply a second preload to a first stop and a second stop within the second valve member;

a first displacement sensor carried by the first valve assembly, the first displacement sensor configured to generate a position signal indicating a relative position of the first valve member within the first fluid pathway; and a second displacement sensor carried by the second valve assembly, the second displacement sensor configured to generate another position signal indicating a relative position of the second valve member within the second fluid pathway; and a controller in electrical communication with the first displacement sensor, the second displacement sensor, and the motor, the controller configured to:

receive a command signal from a user input device;

receive a first position signal from the first displacement sensor and receive a second position signal from the second displacement sensor;

compare the command signal with the first position signal and the second position signal;

in response to detecting a difference between the command signal and the first position signal and a difference between the command signal and the second position signal, transmit a control signal to the motor to position the first valve member and the second valve member to a commanded position;

wherein the first valve member defines a first valve member channel extending along a longitudinal axis of the first valve member;

wherein the first end of the rotor shaft comprises a first valve member drive portion disposed within the first valve member channel of the first valve member;

wherein the first compression assembly comprises:

a first piston disposed within the first valve member channel of the first valve member and disposed in fluid communication with a first pressurized fluid source, the first piston configured to apply the first preload, generated by the first pressurized fluid source, to the first stop within the first valve member, and a second piston disposed within the first valve member channel of the first valve member and disposed in fluid communication with the first pressurized fluid source, the second piston configured to apply the first preload, generated by the first pressurized fluid source, to the second stop within the first valve member, the second piston of the first compression assembly opposing the first piston of the first compression assembly;

wherein the second valve member defines a second valve member channel extending along a longitudinal axis of the second valve member; and wherein the second compression assembly comprises:

a first piston disposed within the second valve member channel of the second valve member and disposed in fluid communication with a second pressurized fluid source, the first piston configured to apply the second preload, generated by the second pressurized fluid source, to the first stop within the second valve member, and a second piston disposed within the second valve member channel of the second valve member and disposed in fluid communication with the second pressurized fluid source, the second piston configured to apply the second preload, generated by the second pressurized fluid source, to the second stop within the second valve member, the second piston of the second compression assembly opposing the first valve member drive portion.

12. The servovalve of claim 1, wherein:

the second end of the rotor shaft comprises a second valve member drive portion disposed within the second valve member channel of the second valve member.

13. The servovalve of claim 11, wherein the controller is further configured to:

receive a third position signal from the first displacement sensor;

compare the third position signal to an analytical model of the first valve member response;

when the third position signal corresponds to the analytical model of the first valve member response, detect translation of the first valve member disposed within the first fluid pathway; and when the third position signal does not correspond to the analytical model of the first valve member response, detect non-translation of the first valve member disposed within the first fluid pathway.

14. The servovalve of claim 13, wherein in response to detecting non-translation of the first valve member disposed within the first fluid pathway, the controller is configured to cause the first compression assembly to remove the first preload from the stop within the first valve member.

15. The servovalve of claim 11, wherein the controller is further configured to:

receive a fourth position signal from the second displacement sensor;

compare the fourth position signal to an analytical model of the second valve member response;

when the fourth position signal corresponds to the analytical model of the second valve member response, detect translation of the second valve member disposed within the second fluid pathway; and when the fourth position signal does not correspond to the analytical model of the second valve member response, detect non-translation of the second valve member disposed within the second fluid pathway.

16. The servovalve of claim 15, wherein in response to detecting non-translation of the second valve member disposed within the second fluid pathway, the controller is configured to cause the second compression assembly to remove the second preload from the stop within the second valve member.

17. The servovalve of claim 11, wherein the first displacement sensor comprises at least two linear variable differential transformers.

18. The servovalve of claim 11, wherein the second displacement sensor comprises at least two linear variable differential transformers.

19. The servovalve of claim 1, comprising a rotary sensor disposed on the motor and configured to detect a rotational position of the rotor shaft relative to a stator.

20. A servovalve, comprising:

a motor having a rotor shaft defining a first and second drive element;

a first servovalve assembly having:

a first housing defining a first fluid pathway, and a first valve member disposed within the first fluid pathway, the first valve member having a first compression assembly configured to apply a first preload to steps a first stop and a second stop within the first valve member; and a second servovalve assembly having:

a second housing defining a second fluid pathway, and a second valve member disposed within the second fluid pathway, the second valve member having a second compression assembly configured to apply a second preload to a first stop and a second stop within the second valve member;

the motor being configured to cause the rotor shaft to (i) apply a first force to the first compression assembly and to the second compression assembly when the first valve member is translatable within the first fluid pathway and the second valve member is translatable within the second fluid pathway the first force being less than or equal to the first preload applied by the first compression assembly and the second preload applied by the second compression assembly and (ii) apply a second force to one of the first compression assembly or the second compression assembly when one of the first valve member or the second valve member is not translatable within the respective one of the first fluid pathway or the second fluid pathway, the second force being greater than one of the first preload applied by the first compression assembly or the second preload applied by the second compression assembly;

wherein the first valve member defines a first valve member channel extending along a longitudinal axis of the first valve member;

wherein the first compression assembly comprises:

a first piston disposed within the first valve member channel of the first valve member and disposed in fluid communication with a first pressurized fluid source, the first piston configured to apply the first preload, generated by the first pressurized fluid source, to the first stop within the first valve member, and a second piston disposed within the first valve member channel of the first valve member and disposed in fluid communication with the first pressurized fluid source, the second piston configured to apply the first preload, generated by the first pressurized fluid source, to the second stop within the first valve member, the second piston of the first compression assembly opposing the first piston of the first compression assembly;

wherein the second valve member defines a second valve member channel extending along a longitudinal axis of the second valve member; and wherein the second compression assembly comprises:

a first piston disposed within the second valve member channel of the second valve member and disposed in fluid communication with a second pressurized fluid source, the first piston configured to apply the second preload, generated by the second pressurized fluid source, to the first stop within the second valve member, and a second piston disposed within the second valve member channel of the second valve member and disposed in fluid communication with the second pressurized fluid source, the second piston configured to apply the second preload, generated by the second pressurized fluid source, to the second stop within the second valve member, the second piston of the second compression assembly opposing the first drive element.

* * * * *

UNITED STATES PATENT AND TRADEMARK OFFICE

CERTIFICATE OF CORRECTION

PATENT NO. : 8,210,206 B2
APPLICATION NO. : 11/945668
DATED : July 3, 2012
INVENTOR(S) : Kim Lige Coakley It is certified that error appears in the above-identified patent and that said Letters Patent is hereby corrected as shown below:

On the title page item (73), Assignee, "Woodward HRT, Inc., Santa Clara, CA (US)" should read -- Woodward HRT, Inc., Santa Clarita, CA (US) --.

Claim 12, Column 11, Lines 43-46, "The servovalve of claim 1, wherein: the second end of the rotor shaft comprises a second valve member drive portion disposed within the second valve member channel of the second valve member" should read -- The servovalve of claim 11, wherein: the second end of the rotor shaft comprises a second valve member drive portion disposed within the second valve member channel of the second valve member --.

Signed and Sealed this
Twenty-first Day of August, 2012

David J. Kappos
*Director of the United States Patent and Trademark Office*